United States Patent Office 3,437,421
Patented Apr. 8, 1969

3,437,421
METHOD OF RETARDING WATER EVAPORATION
William H. Harwood, Ponca City, Okla., assignor to Continental Oil Company, Ponca City, Okla., a corporation of Delaware
No Drawing. Filed June 8, 1960, Ser. No. 34,611
Int. Cl. B01j 1/18
U.S. Cl. 21—60.5                              7 Claims The present invention relates to an improved method of evaporation retardation for use on large bodies of water which are in continual contact with the atmosphere. More particularly the invention relates to an improved method of establishing and maintaining a monomolecular layer of an insoluble substance of an evaporation retardatory nature over extended surfaces of water, such as reservoirs, etc.

The prior art indicates that considerable effort has been made to retard the evaporation of water by the use of monomolecular films with reasonable success on a laboratory level, but none of the methods have been sufficiently successful when used in actual field applications. The organic compounds having the desired film-forming characteristics are well known, and the monomolecular films have been successfully utilized in small scale operations. There has been an unsuccessful search however for a method of applying the film to actual bodies of water, and maintaining it in order to consistently control the evaporation.

Initial attempts to use the retardatory characteristics of the monomolecular films consisted of scattering the film-forming material in the solid state, such as flakes, pellets, etc., on the surface of the bodies of water, but this was excessively hampered by the presence of wind, moisture, and the like, which resulted in abandonment of the efforts. Another method involved dissolving a fatty alcohol in a suitable solvent and applying the solution to the water surface, but this solution application destroyed the mechanics of the film-forming, and further the addition of such solvents to potable water sources was prohibited.

The most recently attempted method to retard evaporation involved establishing a suspension or emulsion of fatty alcohol in water, with water as the continuous phase and alcohol as the dispersed phase. This prepared aqueous suspension or emulsion must be continually maintained, either by the use of mechanical apparatus, or addition of suspending or emulsifying agents until applied to the water surface. Such operations had relative success, but require a number of preparatory steps, equipment for accomplishing the same, and further constant efforts to insure a properly constituted suspension or emulsion.

It is an object of this invention to provide an improved method for retarding the evaporation of water from the surface of open bodies of water.

It is another object of this invention to provide a method of establishing and maintaining a monomolecular layer of fatty alcohol film on the surface of open bodies of water to retard the evaporation of water.

It is a further object of this invention to provide a method of establishing and maintaining a monomolecular layer of fatty alcohol film on the surface of open bodies of water which does not require the use of solvents, water suspensions or emulsions, etc.

Other objects and advantages of this invention will be apparent from the following detailed description.

Briefly, the invention is an improved method of spreading and maintaining a monomolecular layer of fatty alcohols in the liquid state to a water reservoir to retard water evaporation therefrom.

The film-forming substances utilized according to this invention are the long-chained aliphatic alcohols containing 12 to 24 carbon atoms, preferably those containing 16 to 18 carbon atoms, such as hexadecanol or octadecanol, that is cetyl alcohol and stearyl alcohol. Other saturated fatty alcohols containing 12 to 24 carbon atoms show marked effectiveness although not to the degree exhibited by the above preferred alcohols. Unsaturated fatty alcohols, such as oleyl alcohol, have a lower efficiency yet, but are effective for use under some conditions.

The prior art discloses the desirability of applying these alcohols in the solid state to water surface, but there has never been a simple practical method of accomplishing such on a large scale until this invention provided the method described herein. The effectiveness of the alcohol as a retardant is correlated to the particle size at the time of contact with the surface of the water, with the more finely divided particles being most effective.

Particle size of the finely divided alcohol should be in the diameter range of one micron (.001 millimeter) to 100 microns, but preferably in the range of about one micron to about 40 microns. A major portion of the alcohol should be in the above preferred range, but the presence of larger particles in excess of 100 microns does not depart from the scope of this invention. The controlling factor in obtaining the desired retardant characteristics is the presence of a minimum amount of the requisite finely divided solids which is 0.31 moles per acre.

The present invention is directed to a method for achieving evaporation retardation by the unique and novel application and retention of the monomolecular film of alcohols on the surface of the water. The alcohol is first placed in a suitable container and converted to the liquid state by heating it to a temperature at least as great as the melting point of the paricular alcohol which is being utilized. The following is a table indicating the melting points of typical alcohols which are suitable for use in the present invention.

TABLE I

| Alcohol | Melting point, ° C. |
|---|---|
| Dodecanol | 24 |
| Tetradecanol | 38 |
| Hexadecanol | 49 |
| Octadecanol | 58.5 |
| Eicosanol | 65.5 |

The alcohol as the liquid or liquid state is then pumped from the heated container and from a sprayer, nozzle, or atomizer means having conventional orifices in droplet form, and directed over the surface of the body of water. Each component of the spraying equipment must be maintained at a temperature in excess of the melting point of the alcohol as set forth in Table I. This can be achieved by utilizing a hand portable unit, a mounted unit such as a truck, helicopter, etc., or a permanently located system with a central heating arrangement having the necessary lines to the nozzles, etc., being insulated and heated. In order to achieve economically the largest coverage, it is desirable to utilize the wind to blow and distribute the sprayed alcohol over the water. It is obvious that the actual application of the sprayed alcohol to the surface of the water could be readily adapted to the individual situation by a person skilled in the art.

The molten alcohol issues from the spraying apparatus in the desired finely divided particle size, as defined by the size of the orifice of the nozzle, and is readily dispensed evenly over the water. Any type of conventional nozzle, or means for suitably subdividing the alcohol can be used to apply the alcohol in carrying out this method. This alcohol is discharged into the atmosphere above the water in the form of droplets having a substantially uniform size and configuration, much as a mist or fog. The discharged alcohol returns to the solid state after it has been in the atmosphere for the requisite period of time for the temperature to drop below the melting point, whereupon the alcohol settles upon the surface of the body of water as small particles of solid alcohol. In the event of usage under extremely heated conditions, the alcohol may not condense until it actually reaches the surface of the water.

The alcohol on the surface of the body of water in small particle form expands over the surface, providing there is a sufficient quantity applied, in a substantially instantaneous manner. This method allows the alcohol to be applied directly to any surface of water, whether the body of water is still or flowing. The amount of alcohol can be controlled by one skilled in the art in order to obtain a uniform, complete film without waste caused by excess application, and to maintain a uniform monomolecular film on the surface for extended periods of time. This method of applying the alcohols to the water can be repeated or continued as necessary to maintain the film over extended periods of time.

The application of the alcohol can be accomplished effectively in still another manner by loading the liquid alcohol in melted condition into a container means equipped with very fine orifices, allowing the alcohol to solidify and then extruding the material through the orifices onto the surface of the water as a finely divided solid. This could be accomplished by applying pressure, by means of a gas-operated or mechanical plunger, to extrude the alcohol accordingly.

The facilities used in the practice of the method disclosed in the present invention can be of a temporarily or permanently installed nature, and the discharging facilities can be at a single or plurality of locations. A source can be incorporated with each discharge unit, or a central source with the necessary supply lines can be used, but it is preferable to locate the units in positions to take advantage of the prevailing wind.

The following example is submitted for purposes of illustration in order that the method of the present invention may be more readily understood.

Example

A standard 3.5 gallon weed spraycontainer capable of being pressurized by a hand pump was loaded with one gallon of hexadecanol, and the entire unit, except for the spray nozzle, was placed in a drum of heated oil. The unit and contents were heated to 90° C., and the nozzle was heated by an electrical wire heating tape, whereupon the spraying of the alcohol onto the surface of a water reservoir was commenced. The reservoir is substantially rectangular, measuring about 200 yards by 250 yards and having an area of approximately 10 acres. The alcohol was sprayed from a single location on the windward side, a longer side, in the presence of a wind blowing about 15 miles per hour. The coverage from even the single point was good, and the surface of the entire reservoir was rapidly coated with a monomolecular layer in about 5 minutes from the initial spraying.

The film was easily maintainable by intermittent spraying subsequent to the initial coverage. It required approximately .22 gallon of the hexadecanol to establish the film in 15 minutes, and it was subsequently maintained for 100 minutes by applying only about another .36 gallon of the remaining hexadecanol.

It is obvious that many variations may be made in the method of this invention without departing from the spirit and scope thereof as defined in the appended claims. The invention having been thus described, what is claimed and desired to be secured by Letters Patent is:

1. An improved method of retarding normal evaporation from the surface of a body of water open to the atmosphere which comprises heating a fatty alcohol containing 12 to 24 carbon atoms to a temperature in excess of the melting point, spraying the molten alcohol in the atmosphere over said surface, whereby said alcohol settles to said surface; and forming a monomolecular film, thereby retarding said evaporation.

2. An improved method as set forth in claim 1 wherein said alcohol settles to the surface in the solid state.

3. An improved method as set forth in claim 1 wherein said alcohol settles to the surface in the liquid state.

4. An improved method as set forth in claim 1 wherein the fatty alcohol has from 16 to 18 carbon atoms.

5. An improved method as set forth in claim 1 wherein a major portion of the molten fatty alcohol sprayed into the atmosphere has a particle size less than 40 microns.

6. An improved method of retarding normal evaporation from the surface of a body of water open to the atmosphere which comprises heating a fatty alcohol containing 12 to 24 carbon atoms to a temperature in excess of the melting point, spraying the molten alcohol in the atmosphere over said surface, whereby said alcohol settles to said surface; forming a monomolecular film, thereby retarding said evaporation; continuing the spraying of the alcohol on said surface, thereby maintaining the evaporation retarding film.

7. A method for reducing the rate of evaporation from the surface of a body of water open to the atmosphere which comprises melting a long chain fatty alcohol of the group consisting of hexadecanol and octadecanol, and spraying the molten alcohol in the form of a mist into the air above the surface of said body of water whereby said alcohol settles from the air onto the surface of the water and spreads spontaneously to form a continuous monomolecular film upon the water surface which film retards evaporation of water from said surface.

References Cited

UNITED STATES PATENTS 2,878,098   3/1959   Treloar _____ 21—60.5

OTHER REFERENCES

Mansfield: Australian Journal of Chemistry, vol. 12, No. 3, August 1959, p. 393.

MORRIS O. WOLK, *Primary Examiner.*

J. ZATARGA, *Assistant Examiner.*

U.S. Cl. X.R.

21—58